United States Patent [19]

Papadakis

[11] 4,225,223

[45] Sep. 30, 1980

[54] EASEL ARRANGEMENT AND METHOD

[76] Inventor: George M. Papadakis, 12 Angello Ter., Grover City, Calif. 93433

[21] Appl. No.: 37,890

[22] Filed: May 10, 1979

[51] Int. Cl.³ .................... G03B 27/58; G03B 27/44
[52] U.S. Cl. .......................................... 355/74; 355/54
[58] Field of Search .................... 355/18, 68, 46, 54, 355/53, 67, 72, 74, 75, 77; 354/120, 121, 123, 124

[56] References Cited

U.S. PATENT DOCUMENTS

| | | | |
|---|---|---|---|
| 1,552,127 | 9/1925 | Ellingson | 355/75 |
| 2,441,843 | 5/1948 | Raiff et al. | 355/54 |
| 2,599,859 | 6/1952 | Ogg | 355/72 X |
| 3,290,990 | 12/1966 | Garlick | 355/54 |
| 3,682,547 | 8/1972 | Ratowsky | 355/74 |
| 3,728,021 | 4/1973 | Retzyl et al. | 355/74 |
| 4,160,597 | 7/1979 | Damm et al. | 355/74 |

FOREIGN PATENT DOCUMENTS 411372 6/1934 United Kingdom ................ 354/124

OTHER PUBLICATIONS

I.B.M. Technical Disclosure Bulletin vol. 10, No. 11, Apr. 1968, p. 1735.
E. L. Bailey Document Stop.

Primary Examiner—Donald A. Griffin
Attorney, Agent, or Firm—Flehr, Hohbach and Test

[57] ABSTRACT

A method of making a plurality of individual prints on a single sheet of photographic print paper is disclosed herein along with a particular easel arrangement for carrying out this method. The easel arrangement includes a fixed planar surface of sufficient size to support the photographic print paper for movement between a number of different positions, each corresponding to the placement of a particular print on the overall sheet. In order to make the individual prints, this sheet is manually moved to its various positions with the aid of stop members which engage the leading edge of the sheet but which are readily movable out of engagement therewith. In this way, the sheet of photographic print paper can be easily and accurately moved from position to position.

19 Claims, 18 Drawing Figures

EASEL ARRANGEMENT AND METHOD

BACKGROUND OF THE INVENTION

The present invention relates generally to photographic easels and more particularly to a photographic easel arrangement especially suitable for making a plurality of individual prints on a single sheet of photographic print paper.

Photographic easels are presently available in many different designs and function in various different ways for providing one or more individual prints on a given sheet of photographic print paper. For example, a number of different types of easels are disclosed in the following United States Patents:

U.S. Pat. No. 2,496,701—Groff
U.S. Pat. No. 2,599,859—Ogg
U.S. Pat. No. 3,682,547—Ratowsky
U.S. Pat. No. 3,728,021—Retzyl et al
U.S. Pat. No. 3,829,211—Mitchell
U.S. Pat. No. 3,944,326—Petrini et al Of these patents, the ones which appear most pertinent to the present invention are the Ogg, Ratowsky and Retzyl et al patents. The Ogg patent discloses a paper holder including a plurality of pins which project outward and form stops for accommodating a single size paper corresponding to the size of the print being made but does not provide for multiple prints on a single sheet of paper. The Ratowsky patent discloses an easel adapted to receive photographic paper for providing multiple prints on a single sheet. This single sheet of paper is placed on a carrier which is moved to a given aperture for exposure. The Retzyl et al patent also discloses a multiple print easel utilizing a movable carrier for supporting a sheet of photographic paper between engagable stops. This carrier cooperates with windows which may be selectively opened for providing prints at various locations on the single sheet.

As will be seen hereinafter, the present invention is similar to Ratowsky and Retzyl et al to the extent that it provides a method of and an arrangement for making a plurality of individual prints on a single sheet of photographic print paper. However, as will also be seen, the method and arrangement disclosed herein provide a number of distinct advantages over and above those attained by prior art easels including those generally described and cited above.

OBJECTS AND SUMMARY OF THE INVENTION

One object of the present invention is to provide an uncomplicated and economical easel arrangement which is especially suitable for making a plurality of individual prints on a single sheet of photographic print paper.

Another object of the present invention is to provide an easel arrangement which is designed to subdivide the sheet of photographic paper into a number of different combinations without removing the paper or moving the easel arrangement.

Still another object of the present invention is to provide an easel arrangement which is designed so that in a darkroom without the aid of lighting a single sheet of photographic paper can be easily and accurately moved manually to a number of different print placement positions for producing the individual prints making up the sheet.

Yet another object of the present invention is to provide an easel arrangement which is readily adaptable for use with sheets of photographic print paper of different sizes and which may be readily modified to subdivide a given sheet in different ways for varying the number of prints on a single sheet and hence the size of each print including using every square inch of paper and hence eliminating waste.

Still another object of the present invention is to provide an easel arrangement which is readily adapted for making prints of different sizes using the same negative (or positive) or a different negative (or positive), even on the same sheet of photographic print paper and without removing the sheet from within the arrangement.

Yet another object of the present invention is to provide an easel arrangement which is completely light proof so that the exposing process may be started and thereafter temporarily or indefinitely postponed before it is completed without adversely affecting the overall developing process.

A further object of the present invention is to provide a method of making a plurality of individual prints on a single sheet of photographic print paper incorporating the various advantages attained by the easel arrangement of the present invention.

As will be discussed in more detail hereinafter, the easel arrangement disclosed herein and designed in accordance with the present invention includes means defining a horizontally extending, fixed planar surface of sufficient size to support a single sheet of photographic print paper for movement thereon along at least one predetermined straight line path. As will be seen, this movement is required for locating the sheet in different print placement (exposing) positions and is carried out manually in the darkroom without the aid of light. As a result, the easel arrangement disclosed herein also includes means fixed in the horizontal direction relative to the planar surface and engagable with the sheet for guiding the latter along its path and means for locating the sheet in at least two different exposing positions along the path.

The sheet locating means just recited includes at least one stop member which is supported in a first position for engaging the leading edge of the sheet when the latter moves into a predetermined one of the exposing positions during movement along its path and a second position out of engagement with the sheet's leading edge. By initially maintaining this stop member in its first position, the developer knows when the sheet is in a specific print placement position (for exposure) as the sheet is moved manually along its path. In this regard, the overall arrangement also includes light impervious cover means located over the planar surface for covering this surface and the sheet thereon. This light impervious cover means includes an opening located in a fixed position above the planar surface for passing light therethrough, whereby to develop a different portion of the sheet of photographic print paper at each of the predetermined placement positions for making a plurality of prints.

DETAILED DESCRIPTION AND PREFERRED EMBODIMENTS

Figure 1:
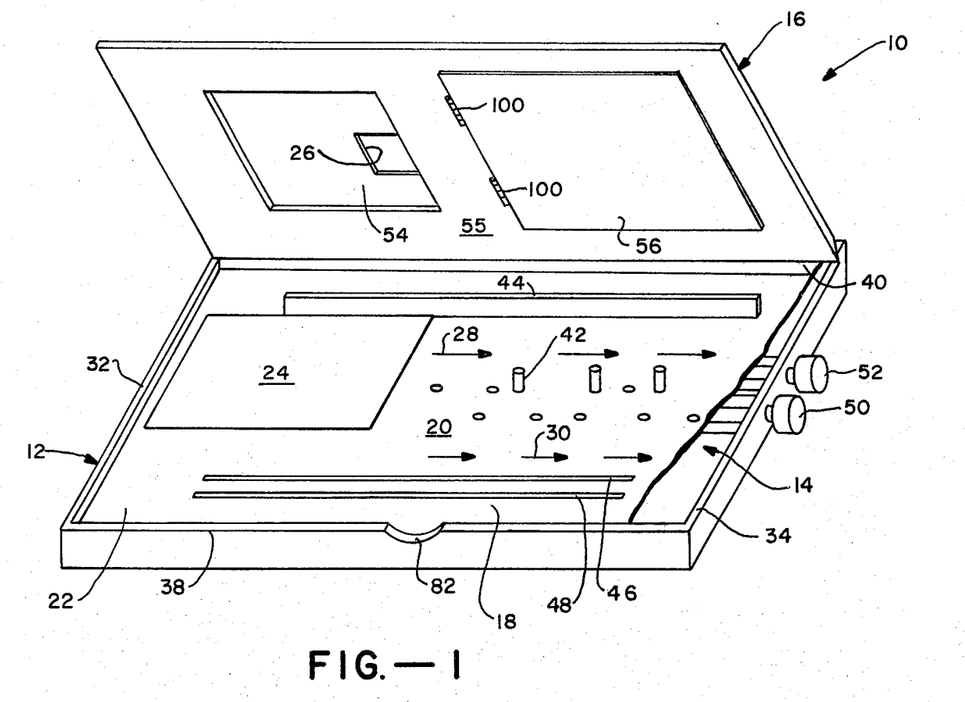
FIG. 1 is a perspective view of an easel arrangement constructed in accordance with the present invention.

Turning now to the drawings, wherein like components are designated by like reference numerals throughout the various figures, attention is specifically directed to FIG. 1 which illustrates an easel arrangement 10 designed in accordance with the present invention. As will be discussed in more detail hereinafter, arrangement 10 includes a base 12 which serves a number of purposes, a spacing mechanism 14 and a cover assembly 16. The base serves to support spacing arrangement 14 and a flat plate member 18 which defines an upwardly facing, horizontally extending planar surface 20. The base also serves to pivotally support cover assembly 16 between the open position illustrated in FIG. 1 and a closed position directly over and spaced from planar surface 20. With the cover assembly in its later position, it cooperates with base 12 to provide a light impervious chamber 22.

It should be apparent that the easel arrangement thus far described can be used in a conventional process for developing a single print on a sheet of photographic print paper generally indicated at 24. This process would first require the developer to remove the cover assembly 16 off the base 12 and set it aside. The base is then placed under the enlarger (not shown) in such a manner as to project the desired image directly on the photographic paper 24. In this case the base 12 acts merely as a support and locator for the photographic paper.

Arrangement 10 not only serves in a conventional way for making a single print on a single sheet of photographic paper, but is especially suitable for making a plurality of individual prints on a given sheet, for example, on sheet 24. In order to more fully understand the way this is accomplished in accordance with the present invention, certain aspects of the easel arrangement must be pointed out at this time. First, it is to be noted that planar surface 20 is significantly larger in surface area than sheet 24, specifically of a size sufficient to support the sheet for movement thereon along at least one predetermined straight line path indicated by arrows 28. In a preferred embodiment, the planar surface is sufficiently large to support sheet 24 for movement along two paths, the straight line path 28 and a second parallel straight line path 30. Note that both paths extend from the left upwardly projecting side 32 of base 12 to its right projecting side 34, in directions parallel to the front and back projecting edges 38 and 40.

As stated previously, base 12 supports spacing mechanism 14. As will be discussed in more detail hereinafter, this spacing mechanism includes a plurality of spacing pins 42, predetermined ones of which are initially maintained in positions projecting up beyond surface 20 on straight line paths 28 and 30. The spacing mechanism also includes three removable margins or edge guides, an upper margin 44 and lower parallel margins 46 and 48, all of which are movable between an upper guiding position extending up between planar surface 20 and a lower removed position flush with or below the planar surface. For reasons to be discussed, the upper margin 44 is maintained in its upper guiding position in FIG. 1 while the two lower margins are maintained in their removed positions. In order to move preselected stop pins 42 and the margins between their upper extended positions and their lower positions, spacing mechanism 14 also includes a coupling arrangement which will be described in detail hereinafter. For the moment, it suffices to say that this arrangement includes two selector knobs 50 and 52, each of which is responsible for moving preselected stop pins in an associated row along with an appropriate margin or margins.

Having described easel arrangement 10 generally and before discussing its structure in detail, attention is directed to the way in which the easel is utilized for making a plurality of individual prints on a single sheet of photographic print paper. The process may be best understood as it is described with respect to a particular sheet of photographic print paper to be subdivided into a particular number of individual prints. For purpose of explanation, let it be assumed that a single sheet of 11×14 inch paper is selected and is to be divided into sixteen equal 2¾ inch by 3½ inch prints. Once this decision is made, the operator places arrangement 10 under an appropriate enlarger (not shown) so as to project the desired image (from a negative or positive) over the opening 26 of cover 16. As seen in FIG. 1, this opening is defined by a separate and distinct mask 54 which is removably located within an appropriate opening in a larger body 55 comprising part of cover assembly 16. In this way openings of different sizes can be readily provided. Moreover, a focusing plate 56 is hinge mounted to the underside of cover body 55 and movable between the position shown in FIG. 1 and a second position covering opening 26 to allow proper focusing before development of the print.

As stated previously, the easel arrangement includes two selector knobs 50 and 52. In an actual working embodiment, one of these selector knobs (for example, knob 50) is utilized specifically with 11×14 inch paper while the other selector knob 52 is utilized with 8×10 paper. As will be seen, knob 50 is coupled with one row of stop pins while knob 52 is coupled with the other. Since 11×14 inch paper has been selected, knob 50 is appropriately positioned to provide sixteen equal prints. By placing the knob in this position, the spacing mechanism automatically maintains three stop pins in their upper position, protruding above planar surface 20, specifically the protruding stop pins illustrated in FIG. 1. These stop pins, which are positioned at pre-calculated intervals, act as locaters for the positioning of sheet 24 as will be seen below. In this regard, by placing selector knob 50 in its appropriate position, upper margin 44 is automatically placed in its upper, extended position as shown while the lower margins are automatically maintained in their lower positions. As will be seen, this allows for the proper lateral spacing across planar surface 20 when sixteen prints identical in size are to be made on 11×14 inch paper. The upper margin and one of the lower margins may or may not be extended when a different paper/print combination is selected, as will be seen.

Figure 2A:
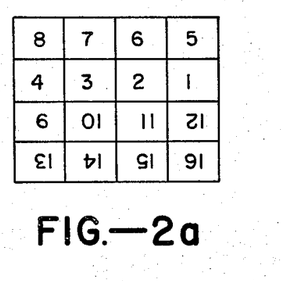
FIGS. 2a through 2f illustrate how a single sheet of 11"×14" photographic print paper can be subdivided into different groups of individual prints by means of the easel arrangement illustrated in FIG. 1.

Having appropriately positioned device 10 relative to the enlarger and having placed knob 50 in its appropriate position, the operator selects the appropriate mask 54, specifically one having an opening 26 which is the same size as each print, that is, a 2¾ inch by 3½ inch opening. This mask is positioned into the corresponding opening in easel cover 55 for positioning smaller opening in the proper location. The focusing plate 56, which is shown in its "flipped back" position, is pivoted to its position under mask 54 for closing opening 26. At this time, the operator moves the cover from its opened position shown in FIG. 1 to its closed position to light seal chamber 22 and thereafter the negative (or positive) image is focused and cropped on the focusing plate. After this is done, the rest of the process is carried out by moving sheet 24 along planar surface 18 in a rapid but accurate way using stop pins 42, margin 44 and bottom edge 38, as will be discussed below. However, in order to more fully understand the purpose behind moving sheet 24 in the manner to be described, attention is briefly directed to FIG. 2a. As seen in this figure, an 11×14 inch sheet of paper is divided into 16 equal parts which are respectively given the numbers 1, 2 and so on up to 16. Each of these numbers represents the position and sequence of exposure of each print during the step by step process and also its orientation on the sheet assuming a single negative (or positive) is used throughout the process and its orientation remains unchanged.

Continuing now with the process (in the dark), cover 16 is moved to its open position and sheet 24 is placed on planar surface 20, emulsion side up, with one long edge of the paper against upper margin 44 while, as stated previously, the lower margins remain flush or below the planar surface. Moreover, the left edge of the sheet as viewed in FIG. 1 is positioned against the inside surface of left hand side edge 32. At this time, the focusing plate is pivoted to its flipped back position so as to clear opening 26 and the entire cover is moved down to its closed position. The negative (or positive) is then projected onto a predetermined portion of sheet 24 through opening 26, specifically the portion designated by the number 1 in FIG. 2a which lies directly under opening 26.

After print #1 has been made, cover 16 is opened and sheet 24 is moved horizontally along previously described path 28 while its upper edge is maintained in flush engagement with the upper margin 44. In this way, the upper margin acts as a guide, ensuring that the sheet is accurately moved along the path. This movement continues until the front edge of the sheet engages the first projecting stop pin 42 whereupon the sheet is in position to expose the second print by closing the cover and repeating the procedure described above. After print #2 has been made, the cover is again opened and the operator manually places the first projecting stop pin in its lower position. At the same time, sheet 24 is moved horizontally over the lowered stop pin along path 28 to the next protruding stop pin. In this regard, it is important that the first stop pin remains in its lowered position, preferably solely by the weight of sheet 24, as will be discussed hereinafter. Once the front edge of sheet 24 has engaged the second projecting stop pin, it is in the proper position relative to opening 26 to provide print #3. Hence, cover 16 is again closed and the previously described exposing procedure is repeated.

In order to provide print #4, cover 16 is opened and sheet 24 is moved to the last projecting stop pin by first manually placing the second projecting stop pin to its lower position and maintaining both the first and second stop pins in this position, again preferably solely by the weight of the sheet. Once sheet 24 engages this last stop pin, it is in position to provide print No. 4 and the previously described exposing procedure is again repeated after cover 16 is closed.

In order to expose prints 5, 6, 7 and 8, the entire sheet of photographic paper 24 is moved down and back to the lower left hand quadrant of planar surface 20 where its lower lengthwise edge is placed flush against the inner surface of bottom edge 38 while its left hand edge (as views in FIG. 1) engages against edge 32. At this time, the previously described procedure of moving sheet 24 from the left to the right is repeated. However, bottom edge 38 of housing 12 is used as a guide to move the sheet along path 30 instead of path 28. In this regard, it is important to place the row of pins associated with knob 50 in a position such that the front edge of sheet 24 engages the projecting pins whether the sheet moves along path 28 or 30. In this way, after print No. 5 is made (with the sheet in its initial position along path 30), it is successively moved from one projecting stop pin to the next until the remaining prints 6, 7 and 8 are made.

After the two top rows of prints have been made, that is, prints No. 1 to No. 8, sheet 24 is rotated 180° and the procedures for making these prints 1 to 8 are repeated for making prints No. 9 to No. 16. However, because the sheet has been rotated 180°, the orientation of these bottom two rows of prints are 180° out of phase with the first two rows of prints. If it is important to have each print oriented in the same way on a given sheet, all that is necessary is to rotate the negative (or positive) 180° after prints No. 1 to No. 8 have been made, of course keeping in mind that the sheet itself must also be rotated 180° as just stated. In any event, it should be noted that this overall process can be temporarily interrupted without disruption merely by closing opening 26 with focusing plate 56 and closing the cover, thereby sealing chamber 22.

In the process just described, the sheet of 11×14 inch photographic paper was utilized and subdivided into sixteen prints equal in size. However, it should be quite apparent that arrangement 10 can be readily utilized to subdivide sheets of photographic paper of many different sizes and each sheet can be readily subdivided in many different ways. For example, in an actual working embodiment, arrangement 10 has been designed especially for use with 11×14 inch paper and also 8×10 inch paper. Moreover, each sheet may be divided in a number of different ways as best illustrated in Table I below. This table indicates the size of each final print (the first column), the number of prints obtained for each size of paper (the second and third column), the spacing of the stop pins and whether the stop pins are to be maintained in a upward, protruding position or a lower position (fourth through fifteenth column) and whether or not the various margins are to be maintained in their upper projecting positions or their lower positions (the last three columns).

For example, a single sheet of paper could be divided into a number of different size prints.

Having described easel arrangement 10 generally and

TABLE 1

| Sizes of Final Prints (inches) | Number of Prints Obtained, Mask Sizes, and Selector Knob Settings | | 14.00" (P1) | 16.33" (P2) | 16.50" (P3) | 17.33" (P4) | 17.50" (P5) | 18.67" (P6) | 19.00" (P7) | 20.67" (P8) |
|---|---|---|---|---|---|---|---|---|---|---|
| | for 8" × 10" | for 11" × 14" | above numbers indicate the distance of each stop from left border of easel. Asterisk (*) indicates stop pins protruding. | | | | | | | |
| Regular Easel (cover off) | 0 | 0 | | | | | | | | |
| 4 × 5 | 4 | 0 | * | | | | | | * | |
| 2⅞ × 3½ | 9 | 0 | * | | | * | | | | * |
| 3¼ × 4 | 6 | 0 | * | | | * | | | | * |
| 2½ × 4 | 8 | 0 | * | * | | | | | * | |
| 2 × 2½ | 16 | 0 | * | * | | | | | * | |
| 5½ × 7 | 0 | 4 | | | | | | | | |
| 4⅞ × 5½ | 0 | 6 | | | | | | * | | |
| 3⅞ × 4⅞ | 0 | 9 | | | | | | * | | |
| 3½ × 5½ / 2¾ × 3½ | 0 | 8/16 | | | | | | * | | |
| 2¼ × 2⅞ | 0 | 24 | | * | | | | * | | |

| Sizes of Final Prints (inches) | 21.00" (P9) | 21.50" (P10) | 23.33" (P11) | 24.50" (P12) | MARGINS UP | | |
|---|---|---|---|---|---|---|---|
| | Above numbers indicate the distance of each stop from left border of easel. Asterisk (*) indicates stop pins protruding. | | | | U. (44) | M. (46) | L. (48) |
| Regular Easel (cover off) | | | | | | * | |
| 4 × 5 | | | | | * | * | |
| 2⅞ × 3½ | | | | | * | | |
| 3¼ × 4 | | | | | * | | |
| 2½ × 4 | * | | | | * | * | |
| 2 × 2½ | * | | | | * | * | |
| 5½ × 7 | | * | | | * | | |
| 4⅞ × 5½ | | | * | | * | | |
| 3⅞ × 4⅞ | | | * | | | | |
| 3½ × 5½ / 2¾ × 3½ | * | | | * | * | | |
| 2¼ × 2⅞ | * | | * | | * | | |

Figure 2B:
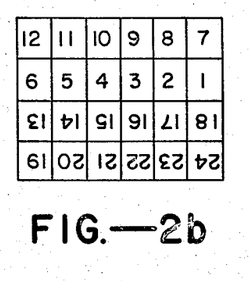

Having briefly described Table I, attention is now directed to FIGS. 2b through 2f which show different ways of subdividing a given sheet 24. For example, FIG. 2b shows an 11×14 inch sheet subdivided into twenty-four prints. As indicated by Table I above, these prints are each 2½ inches by 2½ inches square and four stop pins are maintained in their upwardly projecting positions along with the upper margin. The remaining stop pins and the lower margins are all in their lower positions. From FIG. 2b, it can be seen that the sheet is moved in the same way as the sheet illustrated in FIG. 2a. More specifically, the sheet illustrated in FIG. 2b is first moved along path 28 to provide prints 1 to 6 and then along path 30 to provide prints 7 to 12. Thereafter, the sheet is rotated 180° and the procedure is repeated to provide prints 13 to 18 and 19 to 24.

Figure 2C:
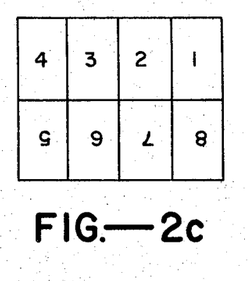
Figure 2D:
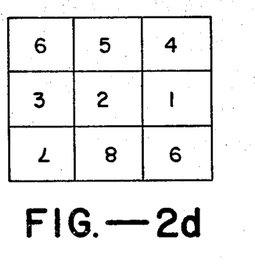
Figure 2E:
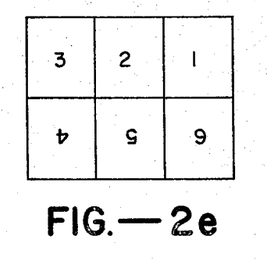
Figure 2F:
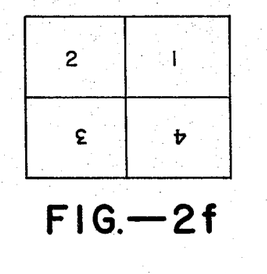
Figure 3:
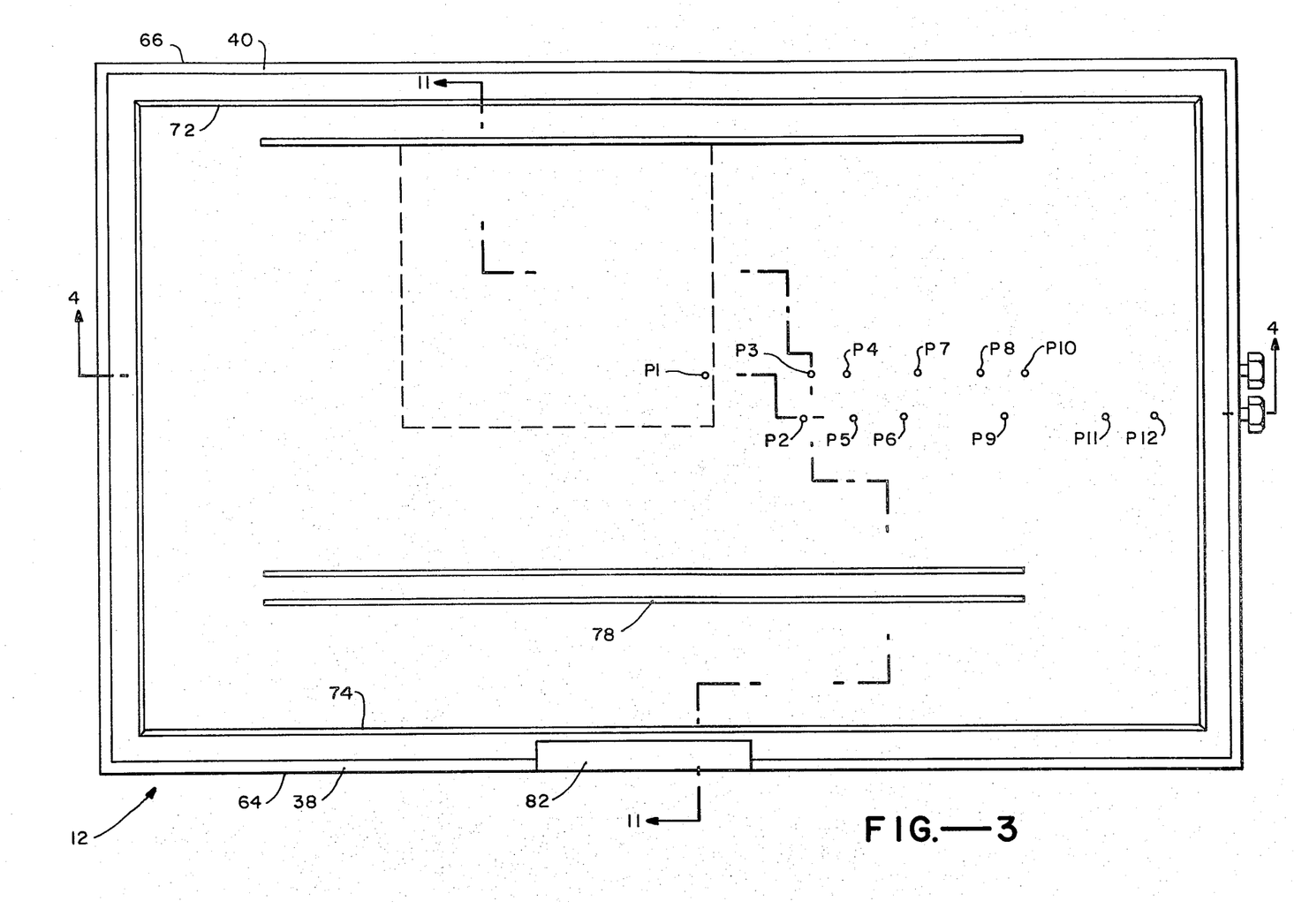
FIG. 3 is a plan view illustrating the easel arrangement of FIG. 1 without its cover.
Figure 4:
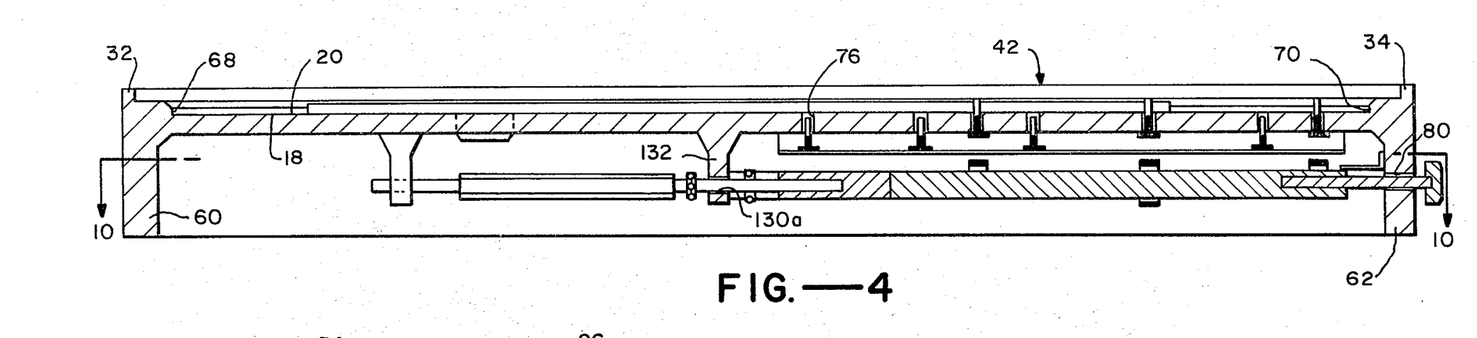
FIG. 4 is a vertical sectional view taken generally along line 4—4 in FIG. 3.
Figure 5:
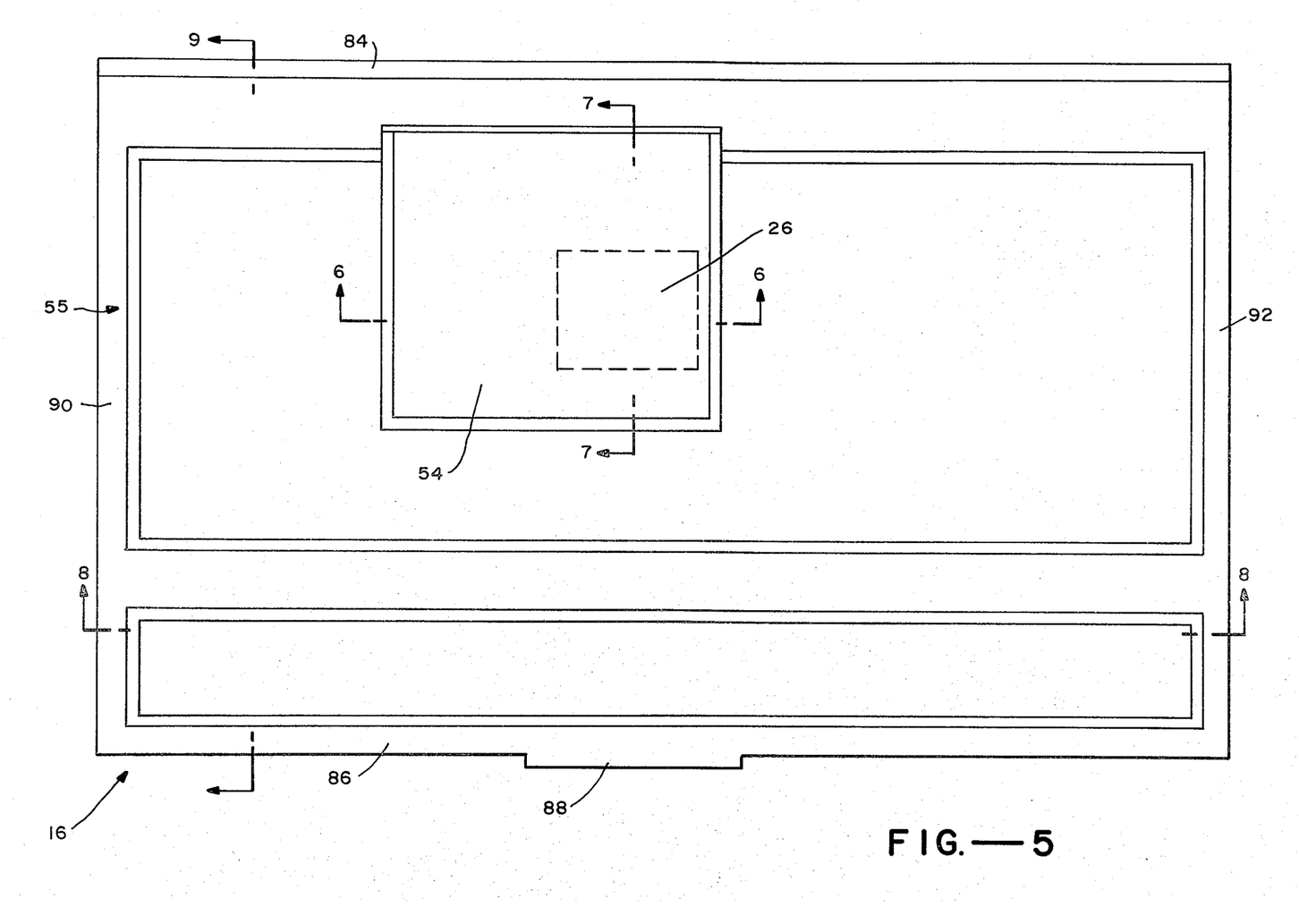
FIG. 5 is a plan view illustrating the cover comprising part of the easel arrangement illustrated in FIG. 1.

In FIG. 2c, only eight prints are provided wherein nine prints are provided in the sheet illustrated in FIG. 2d. Six prints are developed on the sheet illustrated in FIG. 2e and four prints on the sheet illustrated in FIG. 2f. All of the information needed to provide these prints and other utilizing easel arrangement 10 designed in accordance with the preferred embodiment of the present invention can be obtained from Table I. In this regard, it is however to be understood that the present invention is not limited to this specific embodiment but could be readily designed for use with photographic paper of different sizes and photographic paper which is subdivided in different combinations of 2a through 2f.

the way this arrangement is utilized for making a plurality of original prints on a single sheet of photographic print paper, attention is now directed to its structure in detail. In this regard, reference is initially made to FIGS. 3 and 4 illustrating housing 12 which, as stated previously, comprises part of the overall easel arrangement. As seen best in FIG. 4, this housing includes previously recited top plate 18 which defines previously described planar surface 20. It also includes side walls 60 and 62 (FIG. 4) and front and back walls 64 and 66 (FIG. 3) which respectively include previously described edges 32, 34, 38 and 40. As seen in both FIGS. 3 and 4, each of these latter edges defines a vertical boundary or border adapted to engage one edge of sheet 24 a some point during the previously described process. The left hand and right hand borders are generally designated at 68 and 70 respectively (FIG. 4) and the upper and lower boundaries or borders (FIG. 3) are generally designated at 72 and 74 respectively. The various distances for stop pins 42 as set forth in Table I above are measured from border or boundary 68 to each pin along a straight line path parallel to boundaries 72 and 74.

Housing 12 also includes a circular opening 76 for each stop pin 42 (FIG. 4) and a longitudinally extending slot 78 (FIG. 11) for each of the margins 44, 46 and 48. As seen best in FIGS. 4 and 11, all of these openings and slots extend through plate 18 from its bottom side to top planar surface 20. Additional openings 80 are provided through side wall 62 for supporting selector knobs 50 and 52 which will be described hereinafter. Finally, the front edge 38 of the housing includes a recess 82 (FIG. 3) providing means for gripping the underside of cover 16 (FIG. 1) for moving the latter to its open position from its closed position.

Turning to FIGS. 5 to 9 and 12, attention is specifically directed to cover 16. As seen in these Figures in conjunction with previously described FIG. 1, cover 16 includes main body 55 which has an outer periphery complimentary to the outer periphery of housing 12 so as to fit over the latter. Main body 55 includes lengthwise back edge section 84 (see FIG. 9) and a lengthwise front edge section 86. Back edge section 84 of the cover is hinge mounted (see FIG. 12) or otherwise suitably connected to and along back edge 44 of housing 12 for movement between its previously described opened and closed position. Front edge 86 is adapted to rest against front edge 38 of housing 12 when the cover is in its closed position and includes a projecting handle means 88 adapted to sit within previously recited recess 82. With the cover in its closed position, its front and back edge sections and its two side edge sections generally designated at 90 and 92 respectively together cooperate with the front and back edges and the side edges of housing 12 for providing a light impervious seal therebetween.

Figures 6, 7:
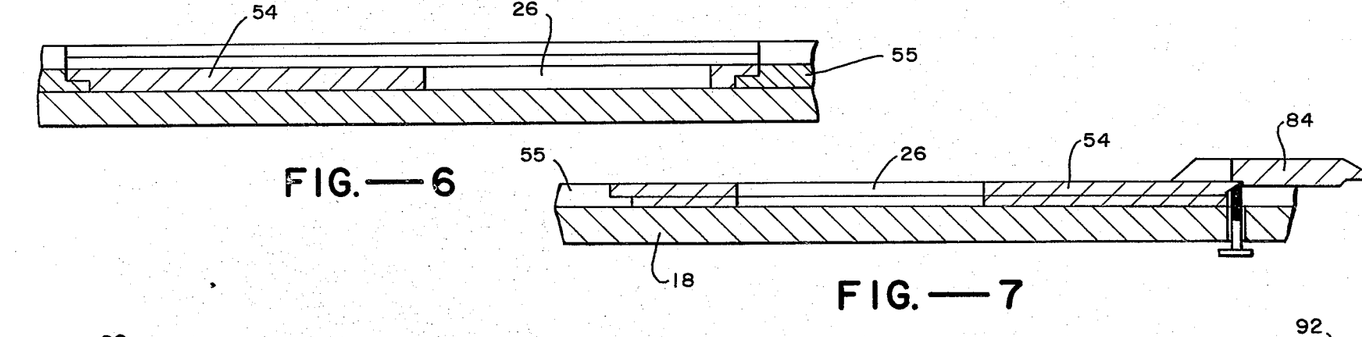
FIG. 6 is a sectional view taken generally along line 6—6 in FIG. 5.
FIG. 7 is a sectional view taken generally along line 7—7 in FIG. 5.
Figures 8, 9:
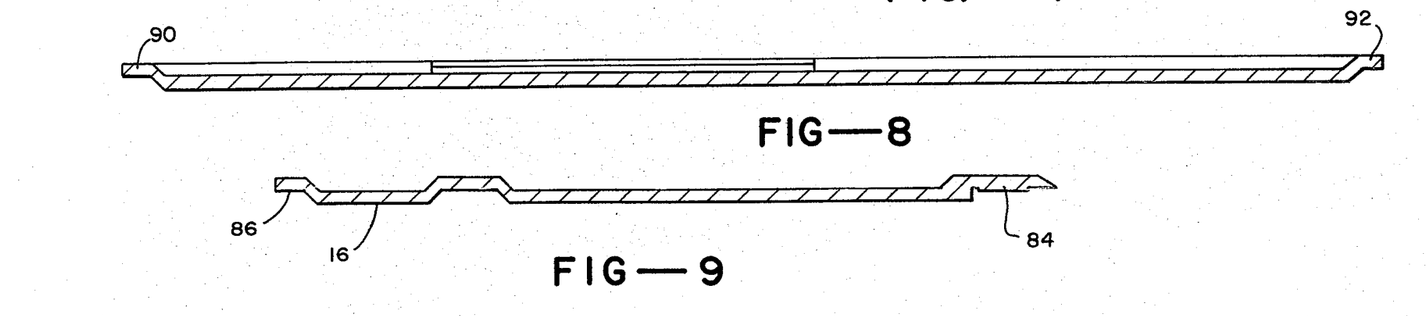
FIG. 8 is a sectional view taken generally along line 8—8 in FIG. 5.
FIG. 9 is a sectional view taken generally along line 9—9 in FIG. 5.
Figures 12, 13:
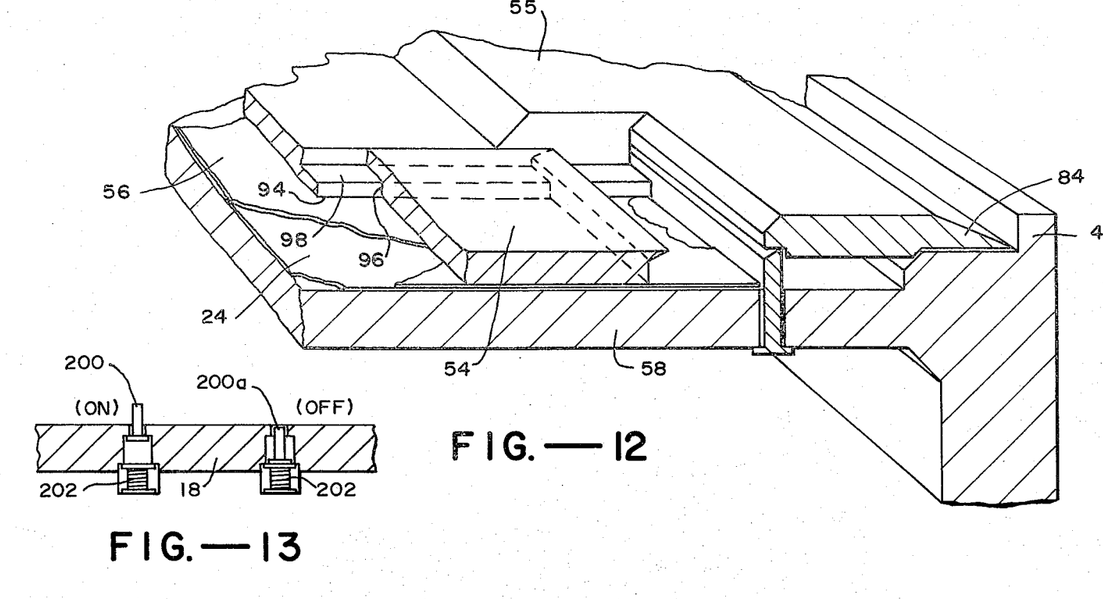
FIG. 12 is a perspective view in section illustrating particular features of the easel cover.
FIG. 13 is a side elevational view schematically illustrating a modification to the arrangement of FIG. 1.

As stated previously with respect to FIG. 1, cover arrangement 16 also includes a removable mask 54 which defines exposure opening 26 and a focusing plate 56. As best seen in FIGS. 6, 7 and 12 in conjunction with FIG. 5, mask 54 is a separate and distinct plate member which sits within a cooperating opening 94 in main body 55 as best seen in FIG. 12. In this regard, the downwardly facing outer periphery of the mask and the upwardly facing outer periphery of the opening include complimentary shoulders generally indicated at 96 and 98 respectively in FIG. 12 so that the mask may be easily fitted within and provide a light seal around the opening and yet may be readily removable therefrom. In this way, a given mask having a given opening 26 may be readily replaced with a different mask having a different sized opening.

Returning briefly to FIG. 1, attention is specifically directed to focusing plate 56. As stated previously, this focusing plate is adapted for movement between its folded back position illustrated in FIG. 1 and a position which completely covers opening 54 and consequently opening 26. The focusing plate is shown in this latter position in FIG. 12. The focusing plate may be suitably mounted to main body 55 of the cover by any suitable means and may be positioned in any suitable way so long as it does not obstruct opening 26 when it is in its folded back position and so that it completely covers the opening when it is in its closed position. Moreover, the folding plate preferably extends under the opening so that the latter is in plain view when the cover is closed and the focusing plate is in its closed position. In this way, the operator can focus the images from the enlarger onto the plate through the opening, as described previously. In the particular embodiment illustrated, the focusing plate is pivotally mounted by means of conventional hinges 100 to the underside of main body 55 to one side of opening 94. In this way, when the cover is opened, the focusing plate can be easily pivoted between its opened and closed position and held in place by suitable locking means (not shown).

Figure 10:
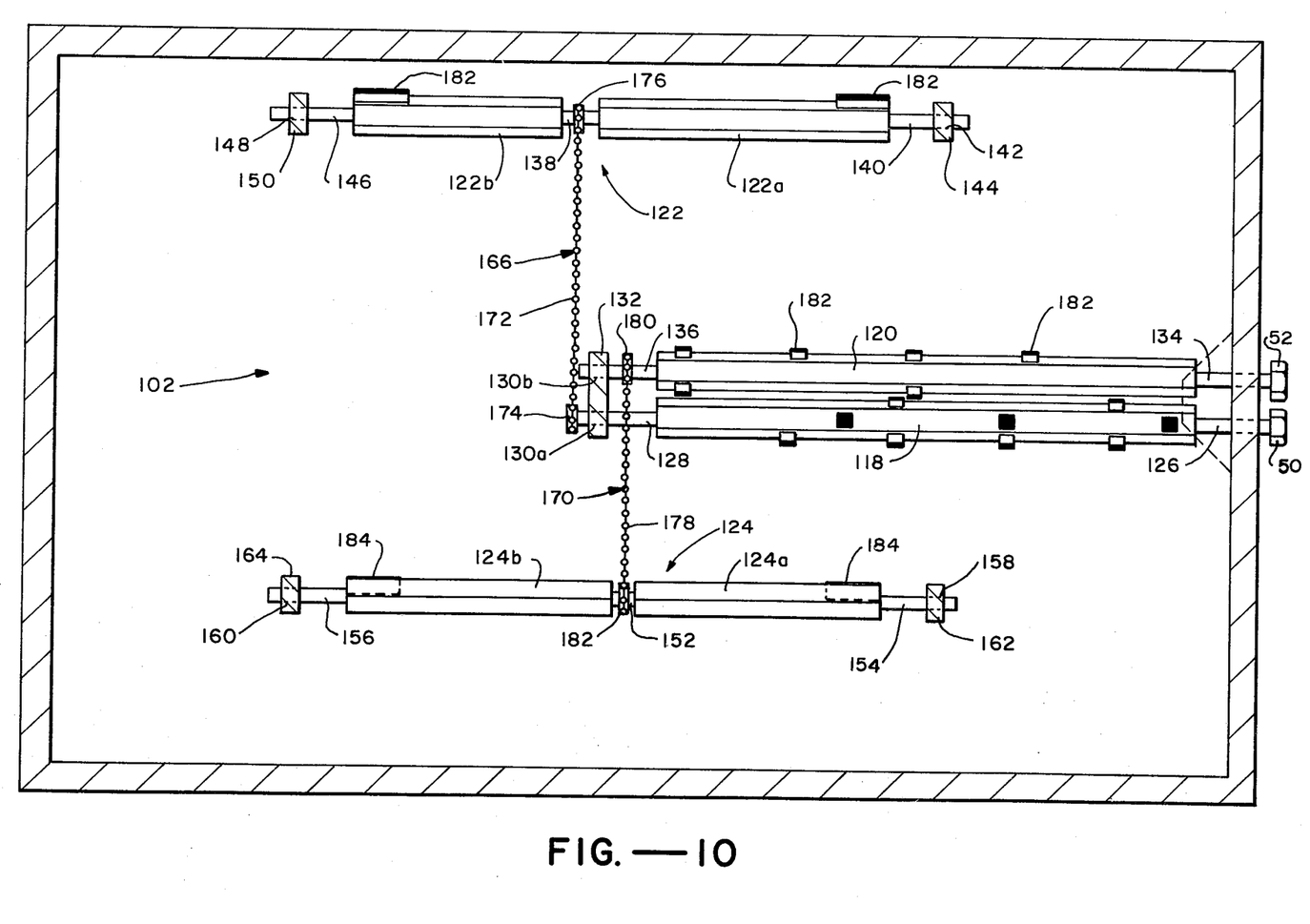
FIG. 10 is a sectional view taken along line 10—10 in FIG. 4.
Figure 11:
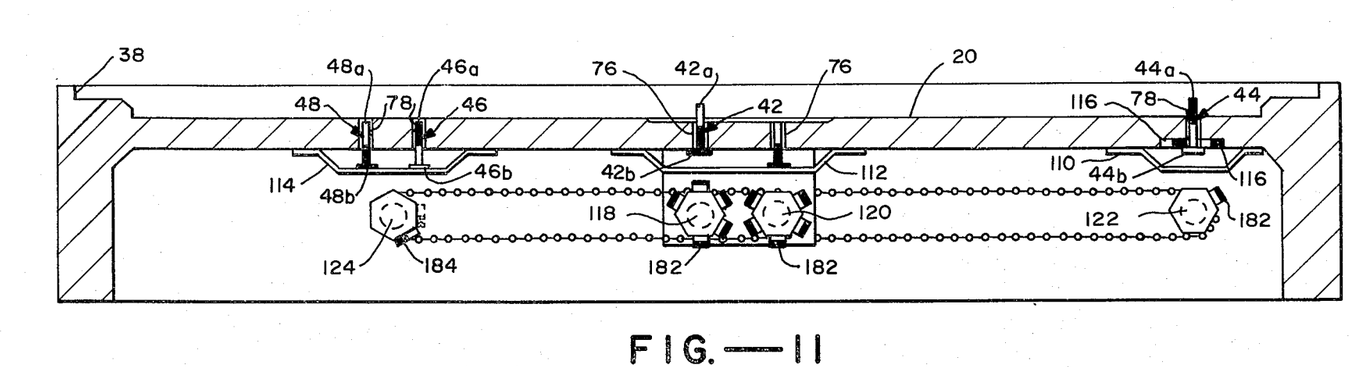
FIG. 11 is a sectional view taken generally along line 11—11 in FIG. 3.

Having described housing 12 and cover 16, attention is now directed to a detailed description of spacing mechanism 14 which is designed in accordance with the present invention. As stated previously, this spacing mechanism includes stop pins 42, margins 44, 46 and 48 and a coupling arrangement including selector knobs 50 and 52. The coupling arrangement which is best seen in FIGS. 4, 10 and 11 is generally designated by the reference numeral 102 in FIG. 10. As will be seen hereinafter, this coupling assembly is provided for maintaining predetermined stop pins 42 and at least one margin 44 and/or 46 or 48 in their lower positions or their upper positions depending on the positions of selector knobs 50 and 52.

In its preferred embodiment, the spacing mechanism in cooperation with the coupling assembly 102 supports each of the stop pins and margins in their extended positions by means of magnetism, specifically by means of the repelling forces between the like poles of separate magnets. Accordingly, each of the stop pins includes a lowermost magnetic section. In an actual embodiment, each of these stop pins is constructed entirely of magnetic material. This magnetic pin has a cylindrical shaft 42a which is slidably received within a previously described opening 76 and a lowermost enlarged head 42b integrally formed at the bottom end of the shaft and extending beyond opening 76 for preventing the stop pin from passing entirely through opening 76 in a vertically upward direction. The bottom end of shaft 42a and the entire enlarged head 42b comprise one pole of the magnetic material making up the stop pin, for example, the south pole (indicated at S and shaded in the figures) and the top end of the shaft comprises the other pole, for example the north pole (indicated at N and not shaded in the figures).

Each of the previously described margins 44, 46 and 48 is designed in a similar manner. More specifically, each of these margins is constructed to include magnetic material, preferably in its entirety, as best seen in FIG. 11. While the margins differ in configuration from stop pins 42 in that the former extend a substantial distance longitudinally, their cross sections are similar as seen in FIG. 11. Hence, the margins include vertically extending shaft sections 44a, 46a and 48a, respectively, each of which is slidably disposed within a previously described slot 78 and enlarged head sections 44b, 46b and 48b, respectively, integrally formed at the bottom end of its shaft section. In the particular embodiment illustrated, shaft sections 44a and 46a comprise south poles, the enlarged heads 44b and 46b comprise the north pole, shaft sections 48a and 42a comprises the north pole and their enlarged heads 48b and 42b comprise the south pole of the magnetic material.

As seen best in FIGS. 4 and 11, each of the stop pins and margins is slidably movable between a lower retracted position with in its associated opening and an upper, raised position therein. In its retracted position, the top end of each pin and margin is at most flush with planar surface 18 but of course, may be located below this surface. In its raised or extended position, a top end section of each pin and margin projects up beyond planar surface 18. In a preferred embodiment of the present invention, each of the stop pins and margins with the possible exception of upper margin 44 is maintained in its retracted position solely by the force of gravity. As a result, coupling arrangement 102 includes three longitudinally extending support members 110, 112 and 114 (FIG. 11), each of which is somewhat trough shaped in cross section. As also seen in this figure, these supports, each of which is constructed of non-magnetic material for reasons to become apparent, are mounted by suitable means (not shown) to the underside of housing plate 18. The support 110 is located below upper margin 44, the support 112 is located below the two rows of stop pins 42 and the support 114 is located below the two lower margins 46 and 48. In this way, each of the stop pins and margins automatically drops to its retracted position by its own weight and rests against an associated support, unless of course an opposing force is externally provided to overcome the force of gravity.

While the upper margin can be provided to operate in this way, in a preferred embodiment, this margin is maintained in its extended position by means of fixed magnets 116 located in the underside of plate 58 adjacent to and on opposite sides of the margin. In this way, the south poles of these magnets interact with the north pole of the margin to maintain the latter in its raised, extended position. As will be seen hereinafter, this particular margin is moved to its lower position by means of magnetic force.

As just stated, all of the stop pins and margins with the possible exception of upper margin 44 move to their retracted positions by gravitational force and are maintained in these positions by means of the trough shape supports just described. However, these stop pins and margins, again with the exception of margin 44, are moved to their extended positions by means of magnetic forces, specifically repelling forces sufficient to overcome the forces of gravity on the stop pins and margins. Accordingly, assembly 102 includes six magnet support rods 118, 120, 122*a* and *b*, and 124*a* and *b* (see FIG. 10), each of which is hexagonal in cross sectional configuration (see FIG. 11). The two support rods 118 and 120 are located directly under and in vertical alignment with the two rows of stop pins 42 just below trough shaped support 112, as best seen in FIG. 11. As best seen in FIGS. 4 and 10, magnet support rod 118 is supported for axial rotation by means of cylindrical support members 126 and 128 fixedly connected to and extending axially out from its opposite ends. The cylindrical support member 126 is mounted for rotation through the previously described opening 80 in wall 62 (FIG. 4) and carries previously described selector knob 50 on its otherwise free end. Cylindrical member 128 extends through an opening (130*a*) which is horizontally aligned with the last mentioned opening 80 and which is provided in a flange 132 extending down from plate 58 and comprising part of housing 12. In this way, the magnet support rod 118 can be rotated by merely rotating the knob 50 so as to place any particular one of the hexagonal surfaces making up the rod in confronting relationship with the enlarged heads of the stop pins located directly above the support rod. Support rod 120 is mounted for rotation in the same way and hence includes cylindrical members 134 and 136 which are fixedly connected to and extend axially out from its opposite ends. Member 134 is mounted for rotation in an associated opening 80 and carries previously described selector knob 52 at its otherwise free end while member 136 extends into the horizontally aligned opening 130*b* in depending flange 132.

As best seen in FIG. 10, the two magnet supporting rods 122*a* and 122*b* are axially aligned with and connected to one another by means of a cylindrical connecting rod 138. The otherwise free end of rod 122*a* includes a cylindrical support member 140 which is mounted for rotation within a cooperating opening 142 in a flange 144 depending down from plate 18. A similar cylindrical member is provided at the otherwise free end of rod 122*b* and is mounted for rotation within a cooperating opening 148 which is horizontally aligned with opening 142 and which is provided within another downwardly depending flange 150. In this way, the two magnet supporting rods are mounted for rotation about a common axis. Moreover, these rods are hexagonally aligned with one another so that corresponding hexagonal surfaces of the two can be positioned in confronting relation with the enlarged head of margin 44 depending upon the rotational position of the two rods. The two magnet supporting rods 124*a* and *b* are connected together in the same way as rods 122*a* and *b* and are also mounted for rotation. Accordingly, a center connecting rod 152 is provided between and connects the two rods 124*a* and *b* in axially aligned relationship with one another and two cylindrical members 154 and 156 are respectively connected to the otherwise free end of rods 124*a* and *b* and supported for rotation in cooperating openings 158 and 160 which are horizontally aligned with one another and provided in respective flanges 162 and 164 connected with and depending from plate 18.

As stated above, the two magnet supporting rods 118 and 120 are rotated by means of selector knobs 50 and 52. As will be seen hereinafter, the rotational position of the margin associated rods 122 and 124 are dependent upon the position of rods 118 and 120. Accordingly, the margin associated rods are mechanically coupled for rotation to these latter rods by interconnect assemblies 166 and 170. More specifically, interconnect assembly 166 is provided for coupling the rotational movement of margin rods 122 with the rotational movement of stop pin rod 118 and includes a continuous chain 172 mounted around two pulleys or sprockets 174 and 176. The pulley 174 is fixedly attached to previously described cylindrical support member 128 and the pulley 176 is fixedly connected for rotation with intermediate connecting rod 138. Hence, as rod 118 is rotated manually by means of knob 50, the two margin rods 122 rotate in synchronism therewith. In a similar manner, assembly 170 includes a continuous chain 178 and two pulleys 180 and 182 for coupling the rotation of margin rods 124 with the rotation of stop pin rod 120. In this regard, the pulley 180 is fixedly connected for rotation with cylindrical support member 136 and pulley 182 is fixedly connected for rotation with interconnect rod 152.

From the foregoing, it should be apparent that as each of the stop pin associated rods is rotated to place one of its hexagonal surfaces in confronting relationship with an associated row of stop pins, the interconnected margin rods also rotate to a predetermined position. In this regard, it should be noted that the individual hexagonal surfaces of support rods 122 are in parallel alignment with the individual surfaces of the stop pin associated rods 118 whereas the individual surfaces of the margin associated rods 124 are not in parallel allignment with the individual surfaces of stop pin associated rod 120. More specifically, when a given surface of rod 118 is parallel with an enlarged head of its associated stop pins, the corresponding surface on each of the rods 122 is in confronting parallel relationship with the enlarged head of upper margin 44. On the other hand, when the rod 120 is positioned so that one of its individual surfaces is in parallel confronting relationship with the enlarged heads of its associated stop pins, the adjoining end of two adjacent surfaces on each of the rods 124 is located just under and between the two lower margins 46 and 48. The reasons for this will become apparent hereinafter.

As stated previously, each of the hexagonal rods comprising part of assembly 102 is provided for supporting a number of magnets 182 (FIG. 11) (in the case of rods 118, 120 and 122) and magnets 184 (in the case of rods 124). As seen best in FIGS. 3 and 10, a certain number of these magnets are fixedly mounted along some of the individual surfaces making up each of these hexagonal rods. As best seen in FIG. 11, each of the magnets 182 is mounted to its associated surface with its north pole attached to the rod and its south pole facing out. Each of the magnets 184 is mounted such that its south pole extends along one longitudinal edge portion of the associated surface and the north pole extends along the other. Each of the magnets 182 on rods 118 and 120 is positioned along its associated surface so as to be located directly under a particular stop pin when the associated surface is positioned below and in confronting relationship with that stop pin. With the magnet and the stop pin so positioned, the magnetism from both is sufficient to provide a repelling force causing that pin to move from its retracted position to its extended position. However, this repelling force is sufficiently weak to allow the pin to be easily manually forced back to its retracted position and maintained in that position by the weight of previously described sheet 24 during the print making process.

The upper margin 44 may be moved to its extended position from its retracted position in the same manner as stop pins 42. However, in a preferred embodiment of the present invention, upper margin 44 is maintained in its extended position by means of magnets 116 as stated previously. On the other hand, the magnets 182 associated with support rods 122 are provided for pulling the margin down to its retracted position. More specifically, as these latter magnets move into position under the margin, the S-N poles of the two result in an attraction force which draws the margin down to its retracted position. In this regard, the magnets 182 must be sufficiently large to overcome the attraction forces between the margin and fixed magnets 116.

The two lower margins 146 and 148 are gravitationally held in their retracted positions like stop pins 42, as stated previously. Moreover, these margins are maintained in their extended positions in a manner similar to that of the stop pins, that is, by means of a magnetic repelling force. However, in the case of margins 46 and 48, the magnets 184 are not located directly under and parallel with the enlarged head sections of the margins but rather slightly to one side of the particular margin to be extended. For example, as illustrated in FIG. 11, when the magnet 184 is located in the dotted line position on the right hand side of rods 124, there is a repelling force between that magnet and the margin 46 for causing the latter to move to its extended position and when the magnet is in the dotted line position on the left side of the rod a repelling force results between the magnet and margin 48 for causing the latter to move to its extended position.

From the foregoing, it should be apparent that the exact positioning of magnets 182 and 184 with respect to the stop pins and margins are selected to provide particular stop pins and margins in their extended positions while others are to remain in their retracted positions depending upon the position of knob 50 or 52. This is of course based upon previously described Table I above. For example, when the easel device is used as a standard easel for making a single print on a single sheet of paper, all of the pins and margins are maintained in their retracted positions (see Table I above). As a result, each of the stop pin associated rods 118 and 120 include individual surfaces without any magnets 182 and these magnet free surfaces are located in position directly under the stop pins. Therefore, none of these pins will be forced to its extended position. At the same time, the margin associated rods are positioned so that their associated margins are in retracted positions. If, on the other hand, the easel arrangement is to be provided for making the sixteen prints shown in FIG. 2a, the selector knob 50 is rotated to the appropriate position so that only those pins positioned at P5, P9, and P12 (see FIG. 3) are forced to their extended positions. At the same time, the upper margin associated rods 120 are rotated so as to cause the upper margin to move to its extended position. The knob 52 remains unchanged with all its related pin and margins in their retracted position. These are of course only two examples taken from Table I above. The easel arrangement can be easily modified in accordance with the other examples in this Table merely by rotating the appropriate selector knob to the appropriate position.

As described above, the various stop pins are moved from their lowered positions to their raised positions by means of a mechanically moved magnet. However, another way of accomplishing this is by means of a stationary electromagnetic. Two magnetized stop pins 200 and 200a are shown in FIG. 13 located within opening through a plate corresponding to plate 18. An electromagnet 202 is located under each opening and operable between a de-energized state and an energized state. Note that when the electromagnet is de-energized, the stop pin (200a) is in the previously described lowered position and rests directly on the electromagnet. However, when the electromagnet is energized it forces the pin to its raised position (pin 200). All of the stop pins and margins could be supported in this way. In the case of the margins, two stop pins could be used with each, one at each end thereof.

The various electromagnets would include wire leads (not shown) to an appropriate power supply. These leads would however be routed through a conventional knob or knobs (actually rotary switches) corresponding in function to knobs 50 and 52 for energizing the appropriate combination of electromagnets.

What is claimed is:

1. An easel arrangement especially suitable for making a plurality of individual prints on a single sheet of photographic print paper, said arrangement comprising:
 (a) means defining a horizontally extending, fixed planar surface of sufficient size to support said single sheet for movement thereon along first and second straight line predetermined paths parallel with one another;
 (b) means fixed in the horizontal direction relative to said surface and engagable with said sheet for guiding the latter along either of said paths, said guide means including first and second longitudinally extending guide members respectfully located parallel with and on opposite sides of said first and second paths and means for supporting each of said first and second guide members in a first raised position extending up from said planar surface for engaging a side edge of said sheet during movement of the latter along its adjacent path and a second lowered position so as not to extend up from said surface;

(c) means for locating said sheet in a number of different predetermined positions along each of said paths, said locating means including
  (i) a plurality of stop members and
  (ii) means for supporting each of said stop members in a first raised position for engaging a leading edge of said sheet when the latter moves into a predetermined one of said positions during its movement along each of said paths, thereby indicating that said sheet is in said one position, and a second lowered position out of engagement with said leading edge, said supporting means selectively supporting predetermined ones of said stop members in said raised position and the rest in said lowered position, and (d) a cover assembly including
  (i) a light impervious cover movable between a first position directly over and covering said planar surface and a second position away from said surface for allowing access thereto, said cover including a main section and a secondary section removably connected with said main section, said secondary section including an opening located in a fixed position above said planar surface when the cover is in its first position for passing light therethrough, whereby to develop a different portion of said sheet of photograph print paper at each of said predetermined positions for making said plurality of prints, and
  (ii) focusing plate means movable between a first position for closing said opening through the secondary section of said cover when the latter is in its first position for substantially preventing any ambient light from reaching said planar surface and a second position away from said opening.

2. An arrangement according to claim 1 wherein:
  (a) each of said stop members is biased in its lowered position by gravity and each includes magnet means; and
  (b) said stop member supporting means includes magnet means associated with each of said stop member and movable between a first position so as not to effect the position of said stop member and a second position for magnetically repelling said associated stop member to its raised position.

3. An easel arrangement especially suitable for making a plurality of individual prints on a single sheet of photographic print paper, said arrangement comprising:
  (a) means defining a horizontally extending fixed planar surface of sufficient size to support said single sheet for movement thereon along at least one predetermined straight-line path;
  (b) means fixed in the horizontal direction relative to said planar surface and engagable with said sheet for guiding the latter along said path;
  (c) means for locating said sheet in at least two different predetermined positions along said path, said locating means including
    (i) at least one stop member including a longitudinal portion located vertically within a cooperating opening in said planar surface for movement between a first position such that said longitudinal portion extends up from said surface and a second position such that said longitudinal portion does not extend up from said surface, said stop member being biased in its second position by gravity and including a magnetized lowermost end section, and
    (ii) means for supporting the stop member in said first position for engaging a leading edge of said sheet when the latter moves into a predetermined one of said positions during its movement along said path, thereby indicating that said sheet is in said one position, and said second position out of engagement with said leading edge, said supporting means including means for preventing further downward movement of said stop member when the latter is in its second position, and a magnet movable between a first position sufficiently far from said stop member so as not to effect positioning of the latter and a second position in sufficiently close proximity to said stop member for repelling the latter to its first position; and
  (d) light impervious cover means located over said planar surface for covering said surface and said sheet when the latter is on said surface, said light impervious covering means including an opening positioned above said planar surface for passing light therethrough, whereby to develop a different position of said sheet of photographic print paper at each of said predetermined positions for making said plurality of prints.

4. An easel arrangement especially suitable for making a plurality of individual prints on a single sheet of photographic print paper, said arrangement comprising:
  (a) means defining a horizontally extending fixed planar surface of sufficient size to support said single sheet for movement thereon along at least one predetermined straight-line path;
  (b) means fixed in the horizontal direction relative to said planar surface and engagable with said sheet for guiding the latter along said path;
  (c) means for locating said sheet in at least two different predetermined positions along said path, said locating means including
    (i) at least one stop member including a longitudinal portion located vertically within a cooperating opening in said planar surface for movement between a first position such that said longitudinal portion extends up from said surface and a second position such that said longitudinal portion does not extend up from said surface, said stop member being biased in its second position by gravity and including a magnetized lowermost end section and
    (ii) means for supporting said stop member in said first position for engaging a leading edge of said sheet when the latter moves into a predetermined one of said positions during its movement along said path, thereby indicating that said sheet is in said one position, and said second position out of engagement with said leading edge, said supporting means including means for preventing further downward movement of said stop member when the latter is in its second position, an electromagnet operable between a first de-energized state so as not to affect positioning of said stop member and a second energized state for repelling the latter to its first position, and means for selectively energizing and de-energizing said electromagnet; and (d) light impervious cover means located over said planar surface for covering said surface and said sheet when the latter is on said surface, said light impervious covering means including an opening positioned above said planar surface for passing light therethrough, whereby to develop a different position of said sheet of photographic print paper at each of said predetermined positions for making said plurality of prints.

5. An easel arrangement especially suitable for making a plurality of individual prints on a single sheet of photographic print paper, said arrangement comprising:
   (a) means defining a horizontally extending, fixed planar surface of sufficient size to support said single sheet for movement thereon along at least one predetermined straight-line path;
   (b) means fixed in a horizontal direction relative to said planar surface and engagable with said sheet for guiding the latter along said path, said guiding means including a longitudinally extending guide member located parallel with and to one side of said path and means for supporting said guide member in a first raised position extending up from said planar surface for engaging a side edge of said sheet during movement of the latter along said path and a second lowered position so as not to extend up from said surface;
   (c) means for locaing said sheet in at least two different predetermined positions along said path, said locating means including
      (i) at least one stop member and
      (ii) means for supporting the latter in a first position for engaging a leading edge of said sheet when the latter moves into a predetermined one of said positions during its movement along said path, thereby indicating that said sheet is in said one position, and a second position out of engagement with said leading edge; and
   (d) light impervious cover means located over said planar surface for covering said surface and said sheet when the latter is on said surface, said light impervious covering means including an opening positioned above said planar surface for passing light therethrough, whereby to develop a different position of said sheet of photographic print paper at each of said predetermined positions for making said plurality of prints.

6. An arrangement according to claim 5 wherein said planar surface is of sufficient size to support said sheet for movement thereon along a second path parallel with and to one side of said one path opposite said guide member, said arrangement including a second longitudinally extending guide member located parallel with and to one side of said second path opposite said one path and second means for supporting said second guide member in a first raised position extending up from said planar surface for engaging a side edge of said sheet during movement of the latter along said second path and a second lowered position so as not to extend up from said surface.

7. An arrangement according to claim 6 including a third guide member located parallel with and to one side of said second guide member opposite said second path, said second supporting means supporting said second and third guide members alternately in a first side edge engaging raised position and a second lowered position.

8. An arrangement according to claim 5 wherein said guide member is biased in its lowered position by gravity and includes magnet means movable therewith, said guide member supporting means including
   (i) means for preventing further downward movement of said guide member when the latter is in its lowered position, and
   (ii) a magnet movable between a first position sufficiently far from said guide member so as not to effect positioning of the latter and a second position in sufficiently close proximity to said guide member for repelling the latter to its first position.

9. An arrangement according to claim 8 including means for moving said first-mentioned magnets between their first positions and their second positions simultaneously.

10. An easel arrangement especially suitable for making a plurality of individual prints on a single sheet of photographic print paper, said arrangement comprising:
    (a) means defining a horizontally extending, fixed planar surface of sufficient size to support said single sheet for movement thereon along at least one predetermined straight-line path;
    (b) means fixed in the horizontal direction relative to said planar surface and engagable with said sheet for guiding the latter along said path;
    (c) means for locating said sheet in at least a plurality of different predetermined positions along said path, said locating means including
       (i) a plurality of stop members, and
       (ii) means for simultaneously supporting said stop members in corresponding first positions in order to successively engage a leading edge of said sheet when the latter moves into said different predetermined positions during its movement along said path, thereby indicating the location of said sheet along said path, and in corresponding second positions out of engagement with said leading edge, said last-named means including a single actuator movable between a first position for simultaneously maintaining all of said stop members in their first position and a second position for maintaining at least some of said stop members in their second position, each of said stop members being individually movable manually from its first sheet engaging position to its second position by direct force thereto even with said actuator in its first position; and
    (d) light impervious cover means located over said planar surface for covering said surface and said sheet when the latter is on said surface, said light impervious covering means including an opening positioned above said planar surface for passing light therethrough, whereby to develop a different position of said sheet of photographic print paper at each of said predetermined positions for making said plurality of prints.

11. An arrangement according to claim 10 wherein each of said stop members includes a longitudinal portion located vertically within a cooperating opening in said planar surface for movement between said first position such that said longitudinal portion extends up from said surface for engaging the front edge of said sheet and said second position such that said longitudinal portion does not extend up from said surface.

12. An arrangement according to claim 10 wherein said means for supporting said stop members acts on said members with sufficient force to bias the latter in their first sheet engaging position when said actuator is in its first position but with insufficient force to prevent the weight of said single sheet of paper from forcing the stop members back to their second positions.

13. An arrangement according to claim 10 wherein said cover means is disengagably connected with said planar surface defining means whereby the cover means can be entirely removed for making individual prints without regard to the size of the opening in said cover means.

14. An arrangement according to claim 10 wherein said planar surface is dimensioned and said stop members are positioned relative to one another such that the individual prints made from said single sheet of paper are made without borders and without wasting any of the sheet.

15. An arrangement according to claim 10 wherein said cover means includes a first main section and a second separate section which includes said opening and which is removably connected with said main section so as to be readily replaced with other sections having different sized openings, said cover means being movable between said covering position and a position spaced from said planar surface to gain sufficient access thereto for moving said sheet along said path, said arrangement also including a focusing plate at least as large as the largest one of said openings and being mounted to the underside of said first main section for movement between a first position for closing any one of said openings when said cover means is in its covering position such that substantially no ambient light reaches said planar surface and a second position away from said opening while at the same time allowing said lower means to be maintained in its covering position.

16. An easel arrangement especially suitable for making a plurality of individual prints on a single sheet of photographic print paper, said arrangement comprising:
  (a) means defining a horizontally extending, fixed planar surface of sufficient size to support said single sheet for movement thereon along at least one predetermined straight-line path;
  (b) means fixed in a horizontal direction relative to said planar surface and engagable with said sheet for guiding the latter along said path;
  (c) means for alternatively locating said sheet in a first group of different predetermined positions along said path and a second group of different predetermined positions along said path, said locating means including
    (i) a plurality of stop members,
    (ii) means for simultaneously supporting a first group of said stop members in corresponding first positions for successively engaging a leading edge of said sheet when the latter moves into said different predetermined positions in said first group during its movement along said path, whereby to indicate the location of said sheet along said path, and in corresponding second positions out of engagement with said leading edge,
    (iii) said last-named means also simultaneously supporting a second group of said stop members in corresponding first positions for successively engaging a leading edge of said sheet when the latter moves into said different predetermined positions in said second group during its movement along said path, whereby to indicate the location of said sheet along said path, and in corresponding second positions out of engagement with said leading edge, and
    (iv) said last-named means including a single actuator movable between first and second positions for alternatively maintaining said first and second groups of stop members in their first sheet engaging positions, each of said stop members being individually movable manually from its first sheet engaging position to its second position by direct force thereto regardless of the position of the actuator
  (d) light impervious cover means located over said planar surface for covering said surface and said sheet when the latter is on said surface, said light impervious covering means including an opening positioned above said planar surface for passing light therethrough, whereby to develop a different position of said sheet of photographic print paper at each of said predetermined positions for making said plurality of prints.

17. An arrangement according to claim 16 wherein some of said stop members are common to both of said groups of stop members.

18. An easel arrangement especially suitable for making a plurality of individual prints on a single sheet of photographic print paper, said arrangement comprising:
  (a) means defining a horizontally extending, fixed planar surface of sufficient size to support said single sheet for movement thereon along at least one predetermined straight-line path;
  (b) means fixed in a horizontal direction relative to said planar surface and engagable with said sheet for guiding the latter along said path;
  (c) means for locating said sheet in at least two different predetermined positions along said path, said locating means including
    (i) at least one stop member including a longitudinal portion located vertically within a cooperating opening in said planar surface for movement between a first position such that said longitudinal portion extends up from said surface and a second position such that said longitudinal portion does not extend up from said surface, and
    (ii) means for supporting the stop members in said first position for engaging a leading edge of said sheet when the latter moves into a predetermined one of said positions during its movement along said path, thereby indicating that said sheet is in said one position, and said second position out of engagement with said leading edge, said supporting means acting on said stop member when the latter is in said first position with sufficient force to bias the stop member in said first position but insufficient to prevent the weight of said single sheet of paper from forcing the stop member back to its second position when the paper is laid over and against the stop member on said planar surface; and
  (d) light impervious cover means located over said planar surface for covering said surface and said sheet when the latter is on said surface, said light impervious covering means including an opening positioned above said planar surface for passing light therethrough, whereby to develop a different position of said sheet of photographic print paper at each of said predetermined positions for making said plurality of prints.

19. An easel arrangement especially suitable for making a plurality of individual prints on a single sheet of photographic print paper, said arrangement comprising:
  (a) means defining a horizontally extending fixed planar surface of sufficient size to support said single sheet for movement thereon along at least one straight line predetermined path;
  (b) means fixed relative to the planar direction of said surface and engagable with said sheet for guiding the latter along said path;
  (c) means for locaing said sheet in at least two different predetermined positions along said path, and
  (d) light impervious cover means located over said planar surface for covering said surface and said sheet when the latter is on said surface, said light impervious covering means being movable between said covering position and a position spaced from said planar surface to gain sufficient access thereto for moving said sheet along said path and including a first main section and a second separate section having an opening positioned above said planar surface for passing light therethrough, whereby to develop a different position of said sheet of photographic print paper at each of said predetermined positions for making said plurality of print, said second section being removably connected with said main section so as to be readily replaced with other sections having different sized openings, and
  (e) a focusing plate at least as large as the largest one of said openings and being mounted to the underside of said first main section for movement between a first position for closing any one of said openings when said cover means is in its covering position such that substantially no ambient light reaches said planar surface and a second position away from said opening while at the same time allowing said cover means to be maintained in said covering position.

* * * * *